United States Patent
Kanazawa

(10) Patent No.: US 7,571,170 B2
(45) Date of Patent: Aug. 4, 2009

(54) ELECTRONIC DEVICE, METHOD FOR DATA MANAGEMENT, AND PROGRAM RECORDING MEDIUM

(75) Inventor: Keizen Kanazawa, Tokyo (JP)

(73) Assignee: Kyocera Mita Corporation, Osaka-shi, Osaka (JP)

( * ) Notice: Subject to any disclaimer, the term of this patent is extended or adjusted under 35 U.S.C. 154(b) by 266 days.

(21) Appl. No.: 11/242,027

(22) Filed: Oct. 4, 2005

(65) Prior Publication Data
US 2007/0078864 A1    Apr. 5, 2007

(51) Int. Cl.
*G06F 17/30* (2006.01)
(52) U.S. Cl. .................. 707/100; 707/101; 707/102
(58) Field of Classification Search .................. 707/100
See application file for complete search history.

(56) References Cited

U.S. PATENT DOCUMENTS

| 5,129,076 | A | * | 7/1992 | Freeman et al. ............. 711/111 |
| 5,574,901 | A | * | 11/1996 | Takahashi ...................... 707/1 |
| 5,907,848 | A | * | 5/1999 | Zaiken et al. ............... 707/202 |
| 2004/0103280 | A1 | * | 5/2004 | Balfanz et al. .............. 713/169 |
| 2005/0190396 | A1 | * | 9/2005 | Ozawa ...................... 358/1.14 |
| 2006/0147233 | A1 | * | 7/2006 | Kamei .......................... 400/62 |

FOREIGN PATENT DOCUMENTS

| JP | 11-007368 | 1/1999 |
| JP | 11-320845 | 11/1999 |
| JP | 2000-035908 | 2/2000 |
| JP | 2004-102600 | 4/2004 |
| JP | 2005-045774 | 2/2005 |

* cited by examiner

*Primary Examiner*—Etienne P LeRoux
*Assistant Examiner*—Thuy (Tiffany) Bui
(74) *Attorney, Agent, or Firm*—Squire, Sanders & Dempsey L.L.P.

(57) ABSTRACT

An electronic device including a receiving unit which receives data to be saved, a data name and a user name from outside, a memory area management unit which saves the data to be saved in a memory area, a directory management unit which assigns a name which relates the data to be saved to already saved data in the memory area to a data management list parameter which expresses a relationship between data saved in the memory area and a display unit which displays the name of data saved in the memory area based on the data management list parameter, in compliance with a demand from outside, wherein the directory management unit changes the name assigned to the data management list parameter, depending on data saved in the memory area.

18 Claims, 5 Drawing Sheets

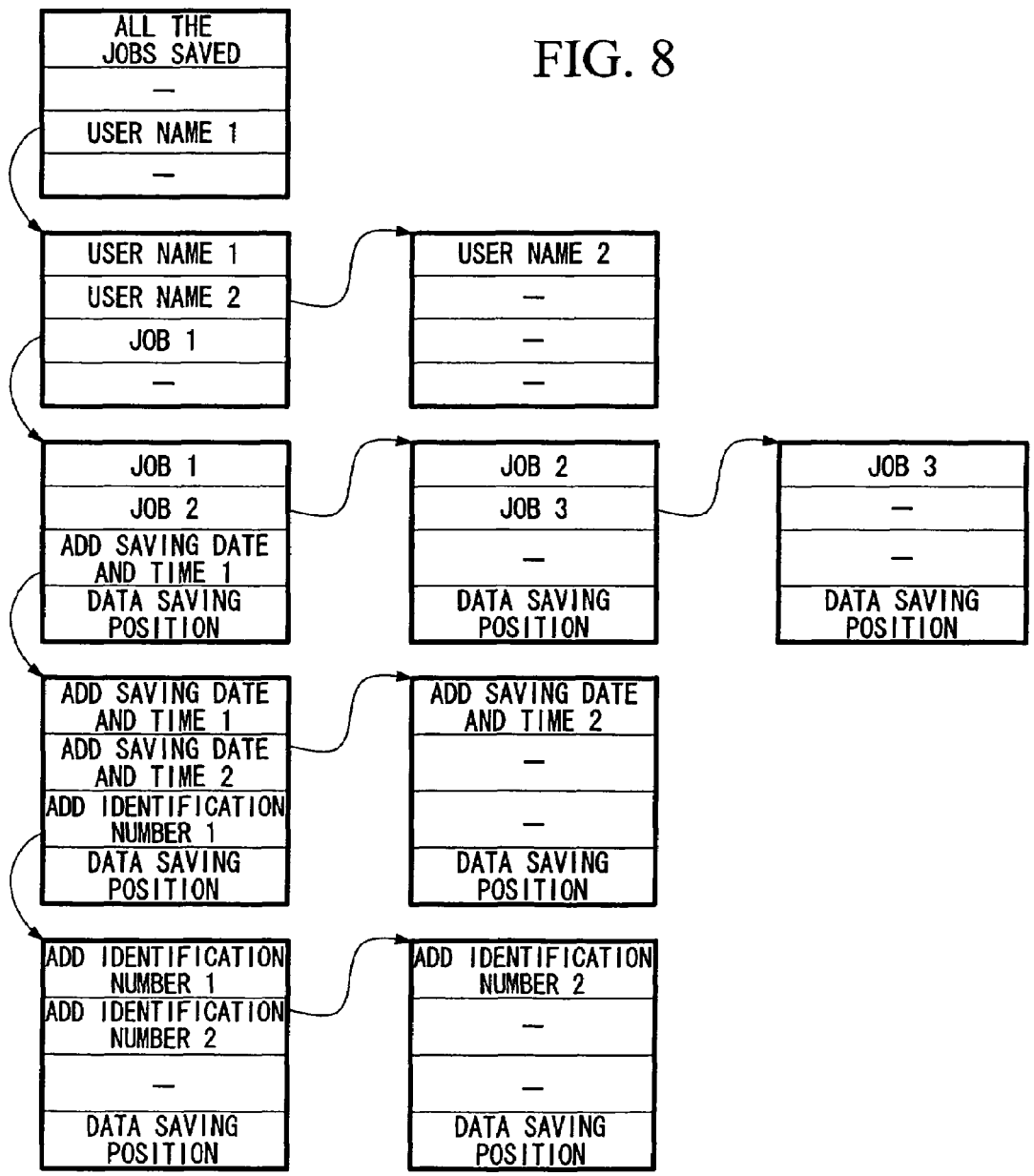

ELECTRONIC DEVICE, METHOD FOR DATA MANAGEMENT, AND PROGRAM RECORDING MEDIUM

BACKGROUND OF THE INVENTION

1. Field of the Invention

The present invention relates to an electronic device such as a multifunction printer (MFP) which is capable of saving data used for a print job, a method for data management, and a program recording medium.

2. Description of the Related Art

In an office such as a corporation or public office, many documents are printed by electronic devices such as printers or MFPs. Some of these documents are used by several members in the office. Because of that situation, some printers and MFPs have a job saving function which is to memorize data used for a print job or other job.

In such electronic devices, it is common to assign a name to the job and save it. A name of a word-processor software is sometimes used as the name assigned to the job. Since these electronic devices usually do not have any sophisticated data management function, users do not name the job.

Setting the name of the software as the job name itself is a convenient way because users do not have to decide the job name.

However, in an office where such electronic devices are used, it is common that several people use the same word-processor software. Therefore, names of jobs tend to be the same. In this case, some conventional printers and MFPs rewrite the job of the same name even though the content of the job which is in the document to be printed is totally different from another job of the same name. Therefore, a job which one user intended to save is sometimes rewritten. In this case, the user has to send the command to print again from a personal computer.

To solve this inconvenience, a technology teaches the addition of a sequential number to the file name assigned when the job is saved, or making a portion of the file name correspond to the date and time when the file is created (refer to Japanese Unexamined Patent Application, First Publication Nos. 2004-102600, H11-7368, H11-320845, and 2005-045774). However, by only adding a continuous number or a date, it is difficult to find the job when a user carries out the job again.

SUMMARY OF THE INVENTION

The present invention provides an electronic device including a receiving unit which receives data to be saved, a data name and a user name from outside, a memory area management unit which saves the data to be saved in a memory area, a directory management unit which assigns a name which relates the data to be saved to already saved data in the memory area to a data management list parameter which expresses a relationship between data saved in the memory area and a display unit which displays the name of data saved in the memory area based on the data management list parameter, in compliance with a demand from outside, wherein the directory management unit assigns a name which includes the data name to the data management list parameter when there is no data which has a name identical to the data name related to the user name in the memory area, assigns a name which includes the data name and time information to the data management list parameter when there is at least one datum which has a name identical to the data name related to the user name in the memory area, and generates an identification number and assigns a name which includes the data name, the time information, and the identification number to the data management list parameter when there is at least one datum which has a name identical to the data name related to the user name and the time information in the memory area.

A job name may be used as the data name, and a sequential number may be used as the identification number. Furthermore, a saving date and time may be used as the time information.

In addition, the present invention provides a recording medium on which is recorded a program for a computer of an electronic device, the program including a step of receiving data to be saved, a data name and a user name from outside, a step of saving the data to be saved in a memory area, a step of assigning a name which relates the data to be saved to already saved data in the memory area to a data management list parameter which expresses a relationship between data saved in the memory area and a step of displaying the name of data saved in the memory area based on the data management list parameter, in compliance with a demand from outside, wherein in the step of assigning a name, a name which includes the data name is assigned to the data management list parameter when there is no data which has a name identical to the data name related to the user name in the memory area, a name which includes the data name and time information is assigned to the data management list parameter when there is at least one datum which has a name identical to the data name related to the user name in the memory area, and an identification number is generated and a name which includes the data name, the time information, and the identification number is assigned to the data management list parameter when there is at least one datum which has a name identical to the data name related to the user name and the time information in the memory area.

As with the above-described electronic device, a job name may be used as the data name, and a sequential number may be used as the identification number. Furthermore, a saving date and time may be used as the time information.

Furthermore, the present invention provides a method for controlling an electronic device including a step of receiving data to be saved, a data name and a user name from outside, a step of saving the data to be saved in a memory area, a step of assigning a name which relates the data to be saved to already saved data in the memory area to a data management list parameter which expresses a relationship between data saved in the memory area and a step of displaying the name of data saved in the memory area based on the data management list parameter, in compliance with a demand from outside, wherein in the step of assigning a name, a name which includes the data name is assigned to the data management list parameter when there is no data which has a name identical to the data name related to the user name in the memory area, a name which includes the data name and time information is assigned to the data management list parameter when there is at least one datum which has a name identical to the data name related to the user name in the memory area, and an identification number is generated and a name which includes the data name, the time information, and the identification number is assigned to the data management list parameter when there is at least one datum which has a name identical to the data name related to the user name and the time information in the memory area.

As with the above-described electronic device and recording medium, a job name may be used as the data name, and a sequential number may be used as the identification number. Furthermore, a saving date and time may be used as the time information.

BRIEF DESCRIPTION OF THE DRAWINGS

FIG. 7 is a drawing which shows a data management list parameter which is a datum used by an electronic device according to an embodiment of the present invention.

FIG. 8 is a drawing which shows data used by an electronic device according to an embodiment of the present invention.

DETAILED DESCRIPTION OF THE INVENTION

Figure 3:
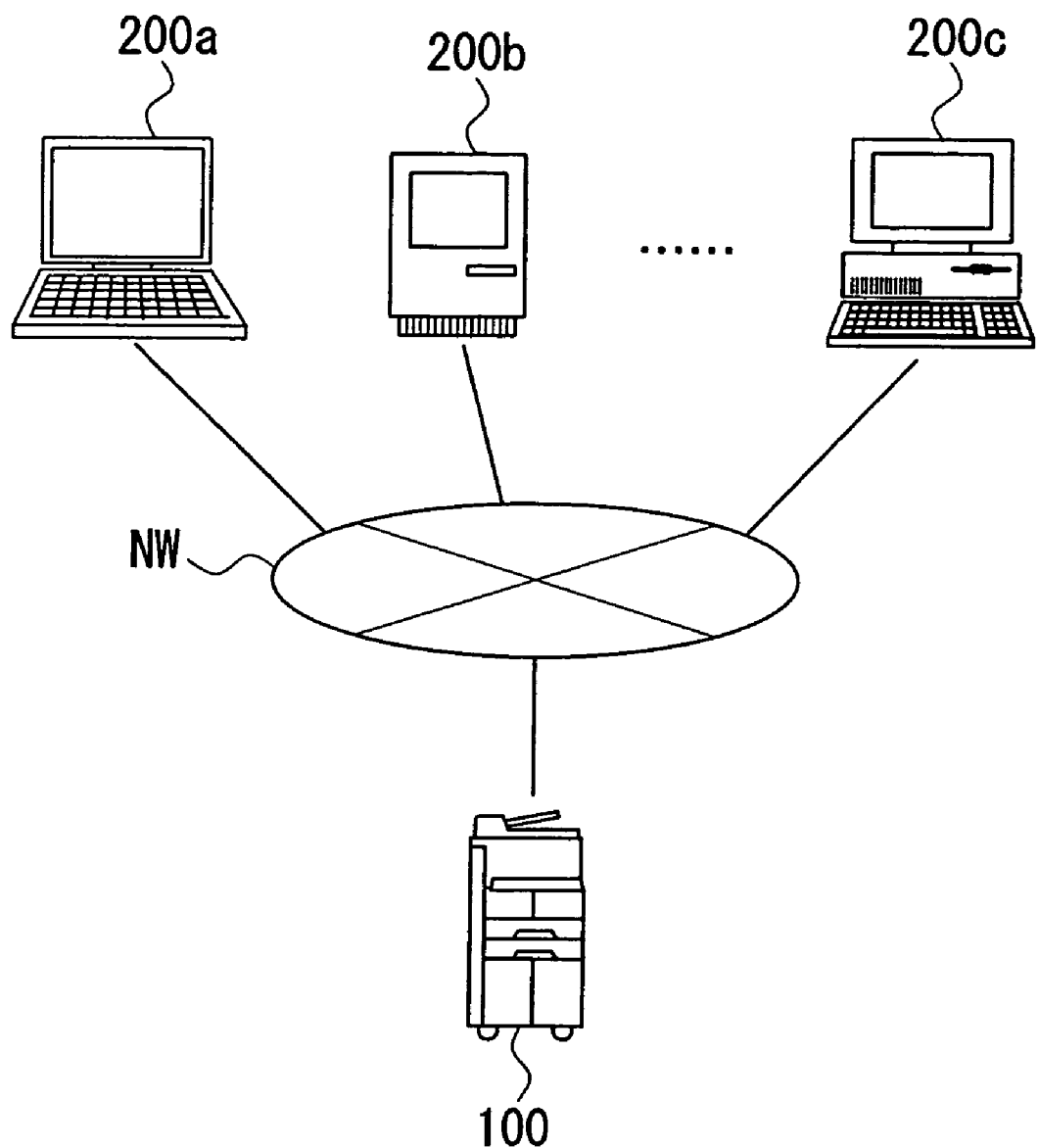
FIG. 3 is a block diagram which shows a constitution of a system using an electronic device according to an embodiment of the present invention.

An explanation of an embodiment of the present invention is given, referring to drawings. FIG. 3 shows a structure of a network including an MFP 100 which is an electronic device of an embodiment of the present invention and personal computers 200a, 200b, and 200c which send document data to the MFP 100 via the network and command the MFP 100 to print.

Figure 4:
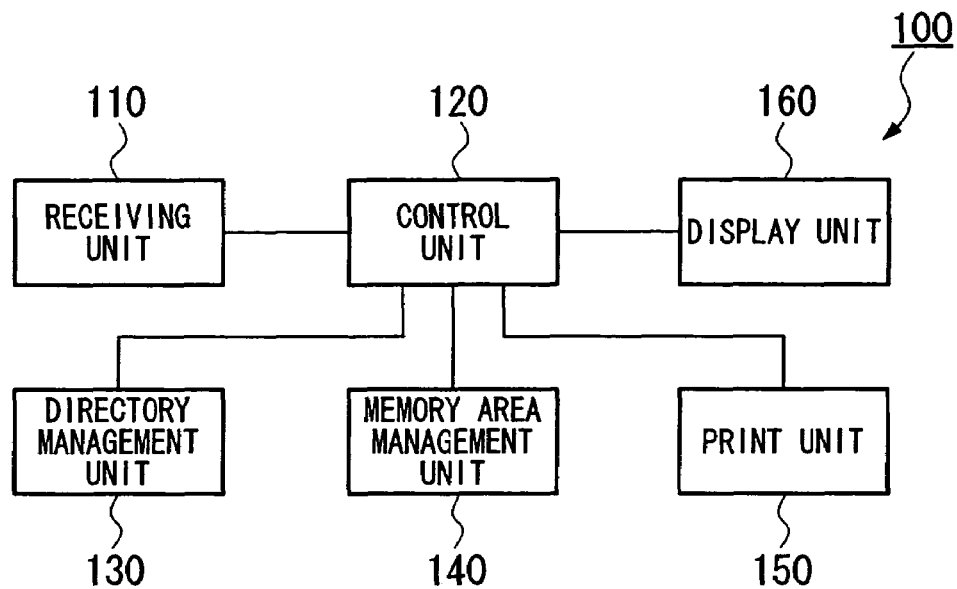
FIG. 4 is a block diagram which shows a constitution of an electronic device according to an embodiment of the present invention.

FIG. 4 shows a constitution of the MFP 100. A control unit 120 has a controlling function which is described in detail hereinafter. A receiving unit 110 receives commands to print from the personal computers 200a, 200b and 200c via the network.

Figure 1:
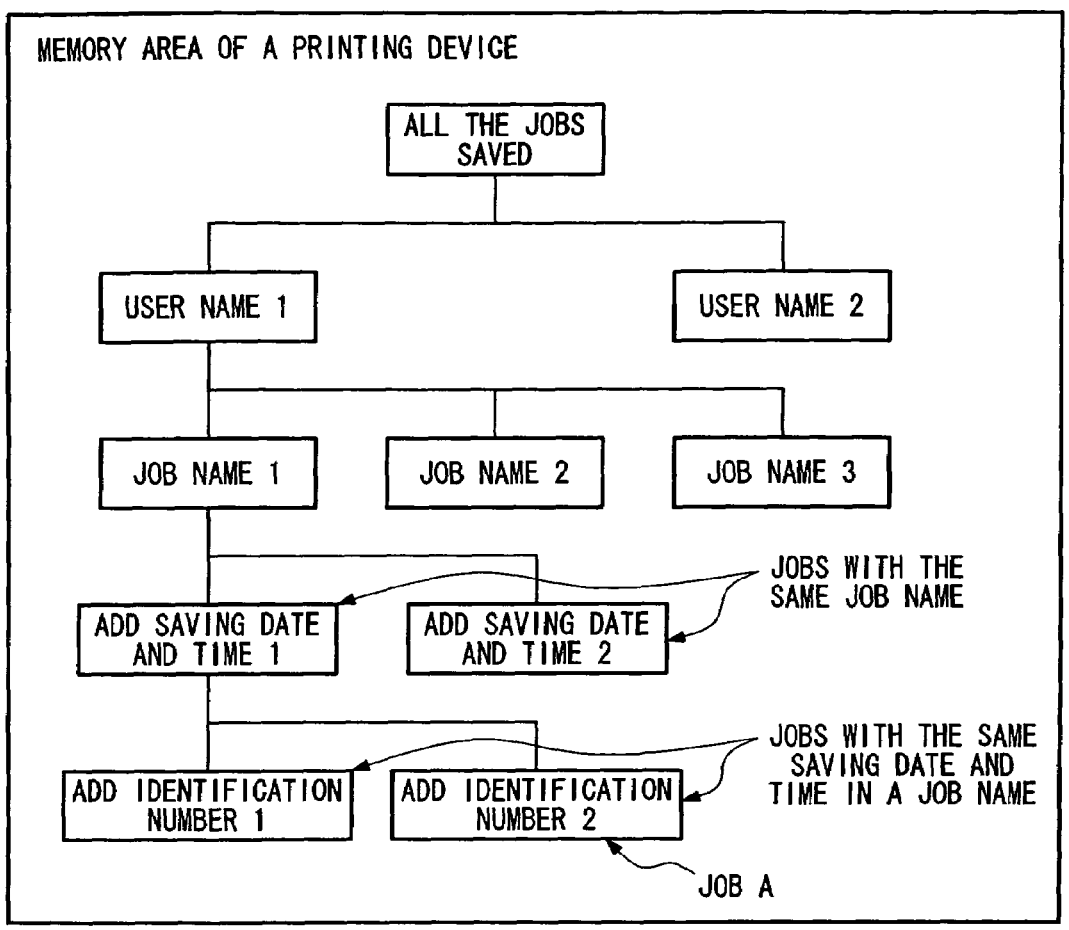
FIG. 1 is a drawing which shows a method of saving jobs in an electronic device according to an embodiment of the present invention.

A directory management unit 130 manages jobs to be saved in a hierarchical fashion shown in FIG. 1.

In FIG. 1, all the jobs are saved in a root directory. There are directories for each user under the root directory and there is each job under a directory for each user.

Each job is a datum to be actually stored. When a job is stored, in a case in which another datum has been sent by the same user and has the same job name, the directory management unit 130 adds the save date and time to the job name. This action corresponds to "addition of save date and time 1" or "addition of save date and time 2" in FIG. 1.

Furthermore, in a case in which another datum has been sent by the same user and has the same job name at the same date and time, the directory management unit 130 adds the save date and time and a sequential identification number to the job name. This action corresponds to "addition of identification number 1" or "addition of identification number 2" in FIG. 1.

The directory management unit 130 uses data management list parameters which are data in a format shown in FIG. 7, in a way shown in FIG. 8 to manage a structure of a directory shown in FIG. 1. A directory name or a job name is used as a name of a data management list parameter of FIG. 7. Sibling node is a pointer from the first-stored job to the next-stored job when a user commands the storage of a job with a different job name. For example, in FIG. 8, the relationship between the data management list parameter of which the name is addition of save date and time 1 and the data management list parameter which the name is addition of save date and time 2 corresponds to the sibling node. In other words, the sibling node shows the sibling relationship among the data management list parameters, and at the same time, sibling node shows the relation among directories.

A childnode of the data management list parameter shows the parental relationship between the data management list parameters. For example, this is a pointer from the first-stored job to the next-stored job when the MFP 100 saves a job with the same user and the same job name. The relationship between the data management list parameter of which the name is addition of save date and time 1 and the data management list parameter of which the name is addition of identification number 2 in FIG. 8 is an example of the parental relationship. Childnodes also show the relationship between directories and the relationship between a directory and a job.

A data saving position of the data management list parameter shows the position where the job is saved in a memory area. The directory management unit 130 sets the data saving position of the data management list parameter of the directory "-", because the data management list parameter of the directory does not need any data saving position. A memory area management unit 140 saves jobs in the memory area. A print unit 150 has a printing function. A display unit 160 displays job names.

An explanation of two process flows, for saving a job and for resubmitting a job again, in the embodiment of the present invention is given, referring to the drawings.

Saving a Job

Figure 2:
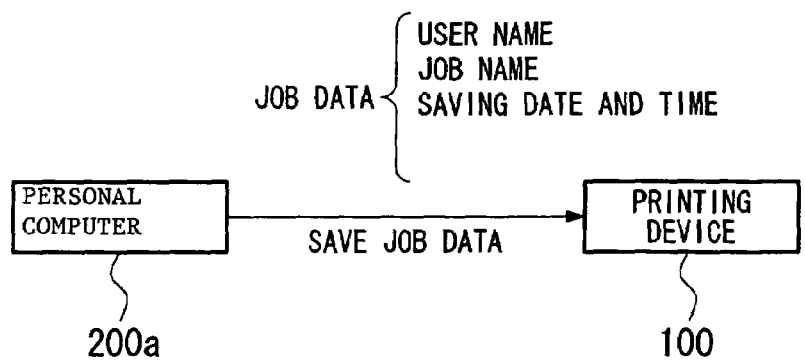
FIG. 2 is a drawing which shows data flow when requesting the saving of a job in an embodiment of the present invention.
Figure 6:
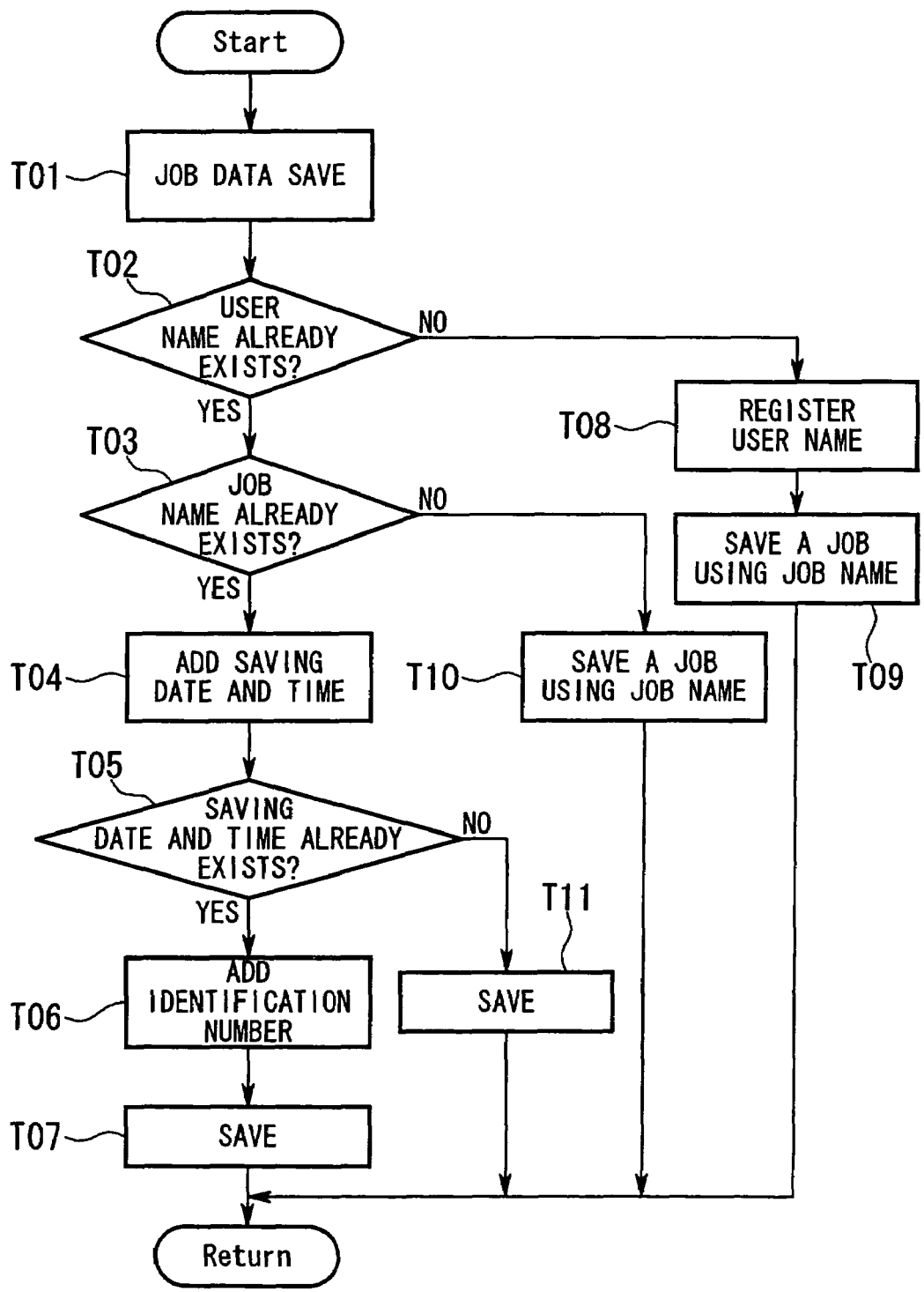
FIG. 6 is a flow chart which shows a process flow of an embodiment of the present invention.

FIG. 6 shows a flow for saving a job. First, the user of the personal computer 200a specifies document data and commands the personal computer 200a to print and save the job. The personal computer 200a receives the command from the user, sends the document data specified by the user to the MFP 100 via the network and commands the MFP 100 to print and the save the job. At this time, the personal computer 200a obtains the user name, the name of an application software which is used to make the document data as a job name, and the date and time at that time as the save date and time from memory, and sends these data with the document data as shown in FIG. 2.

The control unit 120 of the MFP 100 receives the data from the personal computer 200a via the receiving unit 110 and outputs the received document data to the print unit 150 and makes the print unit 150 carry out printing. In addition, the control unit 120 outputs the received document data to the memory area management unit 140 to save the document data as a job.

The memory area management unit 140 receives the data from the control unit 120, saves the data in the memory area (step T01 in FIG. 6), generates information on data saving position according to this saving, and outputs the information to the control unit 120.

The control unit 120 receives the information on the data saving position, outputs the information to the directory management unit 130 with the already received user name, the job name and the save date and time, and commands the directory management unit 130 to register the job to a directory.

The directory management unit 130 receives the data from the control unit 120, reads a tree in a fashion shown in FIG. 8 from the memory area and carries out the registration of the job. First, the directory management unit 130 determines whether the input user name has already been registered (step T02 in FIG. 6).

When the directory management unit 130 finds that the input user name is not registered in the tree in a fashion shown in FIG. 8 ("No" in step T02 in FIG. 6), the directory management unit 130 generates a new data management list parameter shown in FIG. 7, sets the input user name as the name of the data management list parameter and adds it to the tree in a fashion shown in FIG. 8 (step T08 in FIG. 6). This addition is carried out, for example in the tree shown in FIG. 8, by pointing from the sibling node of the data management list parameter whose name is user 2. Thus a directory of the input user name is registered in the tree in a fashion shown in FIG. 8.

The directory management unit 130 generates a new data management list parameter shown in FIG. 7 to relate the input job name to the added directory. In addition, the directory management unit 130 sets the input job name as the name of the data management list parameter and the input information on the data saving position as the data saving position of the data management list parameter. Furthermore, the directory management unit 130 points the data management list parameter to the childnode of the data management list parameter which is generated in step T08 in FIG. 6 (step T09 in FIG. 6). Thus the job is saved.

When the directory management unit 130 finds that the input user name has already been registered in the tree in a fashion shown in FIG. 8 ("Yes" in step T02 in FIG. 6), the directory management unit 130 determines whether a data management list parameter of the same job name as the input job name has already been registered (step T03 in FIG. 6).

When the directory management unit 130 finds that a data management list parameter of the same job name as the input job name is not registered in the input user name ("No" in step T03 in FIG. 6), the directory management unit 130 generates a new data management list parameter shown in FIG. 7, sets the input job name as the name of the data management list parameter and the input information on the data saving position as the data saving position of the data management list parameter, and adds it to the tree shown in FIG. 8 (step T10 in FIG. 6). This addition is carried out, for example in the tree shown in FIG. 8, by pointing from the sibling node of the data management list parameter of job 3. Thus the job is saved.

When the directory management unit 130 finds that the input user name and the input job name have already been registered in the tree in a fashion shown in FIG. 8 ("Yes" in step T03 in FIG. 6), the directory management unit 130 generates the job name to which the save date and time is added by connecting the input save date and time to the input job name (step T04 in FIG. 6).

The directory management unit 130 determines whether the job of the job name consisting of the input user name, the input job name and the save date and time has already been registered (step T05 in FIG. 6). By this determination, it is clarified whether the user is trying to save two or more jobs with one name at that time.

When the directory management unit 130 finds that the job of the job name consisting of the input user name, the input job name and the save date and time is not registered ("No" in step T05 in FIG. 6), the directory management unit 130 generates a new data management list parameter shown in FIG. 7, sets the input job name with the save date and time as the name of the data management list parameter and the input information on the data saving position as the data saving position of the data management list parameter, and adds it to the tree shown in FIG. 8 (step T11 in FIG. 6). This addition is carried out, for example in the tree shown in FIG. 8, by pointing the newly generated data management list parameter to the sibling node of the data management list parameter whose name is save date and time 2. Thus the job is saved.

When the directory management unit 130 finds that the job of the job name consisting of the input user name, the input job name and the save date and time has already been registered ("Yes" in step T05 in FIG. 6), the directory management unit 130 counts the number of data management list parameters to which the childnode of the data management list parameter corresponds to the job name with the save date and time points and its siblings. After that, the directory management unit 130 obtains an identification number.

The directory management unit 130 obtains a job name by connecting the identification number to the end of the job name with the save date and time (step T06 in FIG. 6). In addition, the directory management unit 130 generates a new data management list parameter shown in FIG. 7, sets the obtained job name with the identification number as the name of the data management list parameter and the input information on the data saving position as the data saving position of the data management list parameter, and adds it to the tree shown in FIG. 8 (step T07 in FIG. 6). This addition is carried out, for example in the tree shown in FIG. 8, by pointing to the sibling node of the data management list parameter whose name is identification number 2.

Furthermore, the directory management unit 130 saves a tree in a fashion shown in FIG. 8 in the memory area and outputs the name set to the data management list parameter and an OK signal to the control unit 120. The control unit 120 receives the data and sends the input name and the OK signal to the personal computer 200*a* via the network. The personal computer 200*a* receives data from the MFP 100 via the network, displays the name and notifies the user that the printing and the saving of the job has been completed. The user makes sure that the process has been completed via the display of the personal computer 200*a*.

Resubmitting a Job

Figure 5:
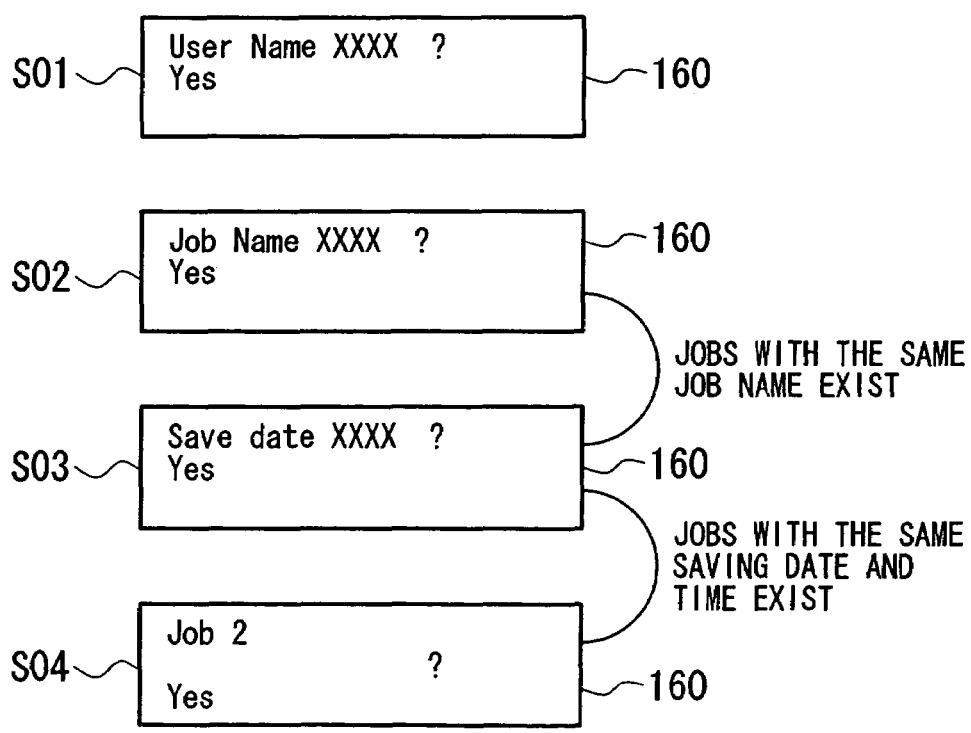
FIG. 5 is a drawing which shows a display of an electronic device according to an embodiment of the present invention.

When resubmitting the job saved by the above-described process, a user commands resubmit to the MFP 100, referring to the display unit 160 of the MFP 100 as shown in FIG. 5. FIG. 5 shows the display unit 160 of the MFP 100 when this process is carried out. The control unit 120 of the MFP 100 receives the command to resubmit the job from the user, successively displays the user names registered in the tree in a fashion shown in FIG. 8 via the directory management unit 130, and displays a message which encourages the user to choose on the display unit 160.

When the user detects that the user's name is displayed on the display unit 160 of the MFP 100, the user inputs "Yes" to the MFP 100 (step S01 in FIG. 5).

The control unit 120 of the MFP 100 receives the command made by the user, and tries to obtain the job name according to the user name selected by the user. The control unit 120 obtains the job name set to the data management list parameter and its siblings, and the data management list parameter which the childnode of the data management list parameter of the selected user name points from the tree in a fashion shown in FIG. 8 via the directory management unit 130. The control unit 120 successively displays the obtained job names on the display unit 160 with a message to encourage the user to choose the job.

When the user finds the job name which the user wants to print on the display unit 160 of the MFP 100, the user inputs "Yes" to the MFP 100 (the step S02 in FIG. 5). The control unit 120 of the MFP 100 receives the command from the user and determines whether the data management list parameter corresponding to the selected job name has any childnodes, based on the information obtained from the directory management unit 130.

When the control unit 120 of the MFP 100 finds that the data management list parameter corresponding to the selected job name does not have any childnodes, the control unit 120 determines that the data which the data management list parameter points to should be printed because there are no data management list parameters in the lower level of the data management list parameters. The control unit 120 outputs the data saving position of the data management list parameter obtained from the directory management unit 130 to the print unit 150, makes the print unit 150 carry out the printing of the document, and finishes the process.

When the control unit 120 finds that the data management list parameter corresponding to the job selected by the user has one or more childnodes, the control unit 120 determines that there are jobs which have the name of the user name and job name with the saving date and time added. The control unit 120 displays a message to notify the user that there are jobs of the job name with the saving date and time added on the display unit 160. The control unit 120 also displays a message to encourage the user to select the job to be printed, the job of the job name or the job of the job name with the saving date and time.

When the user commands to print the job of the job name, the control unit 120 outputs the data saving position of the data management list parameter which corresponds to the job name obtained from the directory management unit 130 to the print unit 150, makes the print unit 150 carry out the printing of the document, and finishes the process.

When the user commands to print the job of the job name with the saving date and time, the control unit 120 obtains the data management list parameter which the childnode of the data management list parameter of the job name points to, and the saving date and time are added to the sibling of the data management list parameter which the childnode points, from the directory management unit 130. Then the control unit 120 successively displays them on the display unit 160, and encourages the user to select one of them.

When the user finds that the saving date and time of the job which the user wants to print is displayed on the display unit 160 of the MFP 100, the user inputs "Yes" to the MFP 100 (the step S03 in FIG. 5). The control unit 120 of the MFP 100 receives the command from the user and determines whether the data management list parameter corresponding to the selected saving date and time has any childnodes, based on the information obtained from the directory management unit 130.

When the control unit 120 of the MFP 100 finds that the data management list parameter corresponding to the selected saving date and time does not have any childnodes, the control unit 120 determines that there are no data management list parameters in the lower level of the data management list parameters. Then, the control unit 120 outputs the data saving position of the data management list parameter obtained from the directory management unit 130 to the print unit 150, makes the print unit 150 carry out the printing of the document, and finishes the process.

When the control unit 120 finds that the data management list parameter corresponding to the selected saving date and time has one or more childnodes, the control unit 120 determines that there are jobs which have the name of the saving date and time with an identification number. The control unit 120 displays a message to notify the user that there are jobs of the job name with the identification number on the display unit 160. The control unit 120 also displays a message to encourage the user to select the job to be printed, the job of the saving date and time or the job of the saving date and time with the identification number.

When the user commands to print the job of the saving date and time, the control unit 120 outputs the data saving position of the data management list parameter which corresponds to the job of the saving date and time obtained from the directory management unit 130 to the print unit 150, makes the print unit 150 carry out the printing of the document, and finishes the process.

When the user commands to print the job of the job name with the identification number, the control unit 120 obtains the data management list parameter which the childnode of the data management list parameter of the job name with the saving date and time, shown in FIG. 7, points to, and the identification number is added to the sibling of the data management list parameter which the childnode points to, from the directory management unit 130. Then the control unit 120 successively displays them on the display unit 160, and encourages the user to select one of them.

When the user finds that the identification number of the job which the user wants to print is displayed on the display unit 160 of the MFP 100, the user inputs "Yes" to the MFP 100 (step S04 in FIG. 5). The control unit 120 outputs the data saving position of the data management list parameter which corresponds to the identification number which the user selects obtained from the directory management unit 130 to the print unit 150, makes the print unit 150 carry out the printing of the document, and finishes the process.

This explanation of preferable embodiments of the present invention, referring to drawings is not intended to be limiting. Those skilled in the art should understand that they can make various changes, substitutions and alterations herein without departing from the spirit of the present invention. For example, although the identification number is used in the embodiment when a plurality of jobs exists in the same saving date and time, it may be possible to make the saving date and time be set in the unit of milliseconds to prevent the above-described situation. In this case, the embodiment becomes simpler because no identification number is used.

It may be possible to rewrite the job when a plurality of jobs exists in the same saving date and time. This does not cause any problems because in most cases where the same user commands to save the job to the MFP 100 at the same time, users try to save the identical document data. In addition, it is simpler than using the identification number.

A receiving date and time of the MFP 100 or saving date and time of the document data may be used instead of the saving date and time. In this embodiment, although the MFP 100 saves the job, receiving a command from the personal computer 200*a*, processing results of a copying function or a scanner which the MFP 100 includes may also be saved in an identical manner.

Furthermore, the user may receive confirmation as to which is selected when a plurality of jobs exist in one job name, among saving all the jobs using a plurality of names, rewriting, or canceling the saving of the job.

Still furthermore, the MFP 100 may display the jobs saved by users in a tree fashion on the display unit of the personal computers 200*a* through 200*c*. Since in this embodiment the control unit of the MFP 100 saves jobs for each user as shown in FIG. 1, displaying a job list for each user becomes simple by generating a job list data in a tree fashion in Hyper Text Markup Language (HTML) style by the control unit 120 of the MFP 100 using the tree shown in FIG. 8, sending the data to personal computers 200*a* through 200*c* and displaying them. It is impossible for conventional art which uses job names, saving date and time, sequential number, or a combination of them to carry out a display which is easy to be understood.

What is claimed is

1. An electronic device, comprising:
a receiving unit which receives data to be saved, a data name, and a user name from outside;

a memory area management unit which saves the data to be saved in a memory area;

a directory management unit which assigns a name which relates the data to be saved to already saved data in the memory area to a data management list parameter which expresses a relationship between data saved in the memory area, wherein the data management list parameter comprises reference data configured to indicate a relationship between the data management list parameter and other data management list parameters; and a display unit which displays the name of data saved in the memory area based on the data management list parameter, in compliance with a demand from outside, wherein:

the directory management unit assigns a name which includes the data name to the data management list parameter when there is no data which has a name identical to the data name related to the user name in the memory area;

the directory management unit assigns a name which includes the data name and time information to the data management list parameter when there is at least one datum which has a name identical to the data name related to the user name in the memory area;

the directory management unit generates an identification number and assigns a name which includes the data name, the time information, and the identification number to the data management list parameter when there is at least one datum which has a name identical to the data name related to the user name and the time information in the memory area;

and the reference data comprises a list parameter name, a sibling node, and a saving position, wherein the list parameter name comprises the name of the data management list parameter, the sibling node comprises a pointer to a next data management list parameter, the child node indicates parental relationships between data management list parameters, and the data saving position indicates a position where the data saved by the memory area management unit is located.

2. The electronic device according to claim 1, wherein the data name is a job name.

3. The electronic device according to claim 1, wherein the identification number is a sequential number.

4. The electronic device according to claim 1, wherein the time information includes at least one of a group consisting of a saving date and time of the date in the memory area, a receiving date and time of the receiving unit, and a generated date and time of the data.

5. The electronic device according to claim 1, wherein the display unit is configured to the name of the data in a tree fashion.

6. The electronic device according to claim 1, wherein the directory management unit receives a user's choice when there is at least one piece of data which has a name identical to the data name related to the user name and the time information in the memory area, the choice being whether to save all the data using a plurality of names, or to rewrite the datum saved in the memory area, and the directory management unit generates the identification number and assigns a name which includes the data name, the time information, and the identification number to the data management list parameter when the user chooses to save all the data using a plurality of names, and the memory area management unit rewrites rewrite the data saved in the memory area when the user chooses to rewrite the data saved in the memory area.

7. A recording medium on which is recorded a program for being executed on a computer of an electronic device, the program comprising:

a step of receiving data to be saved, a data name and a user name from outside;

a step of saving the data to be saved in a memory area;

a step of assigning a name which relates the data to be saved to already saved data in the memory area to a data management list parameter which expresses a relationship between data saved in the memory area, wherein the data management list parameter comprises reference data configured to indicate a relationship between the data management list parameter and other data management list parameters; and a step of displaying the name of data saved in the memory area based on the data management list parameter, in compliance with a demand from outside, wherein in the step of assigning a name, wherein a name which includes the data name is assigned to the data management list parameter when there is no data which has a name identical to the data name related to the user name in the memory area;

a name which includes the data name and time information is assigned to the data management list parameter when there is at least one datum which has a name identical to the data name related to the user name in the memory area;

an identification number is generated and a name which includes the data name, the time information, and the identification number is assigned to the data management list parameter when there is at least one datum which has a name identical to the data name related to the user name and the time information in the memory area; and the reference data comprises a list parameter name, a sibling node, and a saving position, wherein the list parameter name comprises the name of the data management list parameter, the sibling node comprises a pointer to a next data management list parameter, the child node indicates parental relationships between data management list parameters, and the data saving position indicates a position where the data saved by the memory area management unit is located.

8. The recording medium according to claim 7, wherein the data name is a job name.

9. The recording medium according to claim 7, wherein the identification number is a sequential number.

10. The recording medium according to claim 7, wherein the time information includes at least one of a group consisting of a saving date and time of the data in the memory area, a receiving date and time of the receiving unit, and a generated date and time of the data.

11. The recording medium according to claim 7, wherein the name of the data is displayed in a tree fashion in the step of displaying the name of the data.

12. The recording medium according to claim 7, wherein in the step of assigning a name, a choice of a user is received when there is at least one piece of data which has a name identical to the data name related to the user name and the time information in the memory area, the choice being whether to save all the data using a plurality of names, or to rewrite the data saved in the memory area, and the identification number is generated and a name which includes the data name, the time information, and the identification number is assigned to the data management list parameter when the user chooses to save all the data using a plurality of names, and the data saved in the memory area is rewritten when the user chooses.

13. A method for controlling an electronic device, comprising:
- a step of receiving data to be saved, a data name and a user name from outside;
- a step of saving the data to be saved in a memory area;
- a step of assigning a name which relates the data to be saved to already saved data in the memory area to a data management list parameter which expresses a relationship between data saved in the memory area, wherein the data management list parameter comprises reference data configured to indicate a relationship between the data management list parameter and other data management list parameters; and a step of displaying the name of data saved in the memory area based on the data management list parameter, in compliance with a demand from outside, wherein in the step of assigning a name, wherein a name which includes the data name is assigned to the data management list parameter when there is no data which has a name identical to the data name related to the user name in the memory area; a name which includes the data name and time information is assigned to the data management list parameter when there is at least one datum which has a name identical to the data name related to the user name in the memory area; and-an identification number is generated and a name which includes the data name, the time information, and the identification number is assigned to the data management list parameter when there is at least one datum which has a name identical to the data name related to the user name and the time information in the memory area; and the reference data comprises a list parameter name, a sibling node, and a saving position, wherein the list parameter name comprises the name of the data management list parameter, the sibling node comprises a pointer to a next data management list parameter, the child node indicates parental relationships between data management list parameters, and the data saving position indicates a position where the data saved by the memory area management unit is located.

14. The method for controlling an electronic device according to claim 13, wherein the data name is a job name.

15. The method for controlling an electronic device according to claim 13, wherein the identification number is a sequential number.

16. The method for controlling an electronic device according to claim 13, wherein the time information includes at least one of a group consisting of a saving date and time of the data in the memory area, a receiving date and time of the receiving unit, and a generated date and time of the data.

17. The method for controlling an electronic device according to claim 13, wherein the name of the data is displayed in a tree fashion in the step of displaying the name of the data.

18. The method for controlling an electronic device according to claim 13, wherein in the step of assigning a name, a choice of a user is received when there is at least one piece of data which has a name identical to the data name related to the user name and the time information in the memory area, the choice being whether to save all the data using a plurality of names, or to rewrite the data saved in the memory area, and the identification number is generated and a name which includes the data name, the time information, and the identification number is assigned to the data management list parameter when the user chooses to save all the data using a plurality of names, and the data saved in the memory area is rewritten when the user chooses.

* * * * *